United States Patent [19]

Poeppel et al.

[11] Patent Number: 4,476,196

[45] Date of Patent: Oct. 9, 1984

[54] SOLID OXIDE FUEL CELL HAVING MONOLITHIC CROSS FLOW CORE AND MANIFOLDING

[75] Inventors: Roger B. Poeppel, Glen Ellyn; Joseph T. Dusek, Downers Grove, both of Ill.

[73] Assignee: The United States of America as represented by the United States Department of Energy, Washington, D.C.

[21] Appl. No.: 541,177

[22] Filed: Oct. 12, 1983

[51] Int. Cl.³ .............................................. H01M 8/10
[52] U.S. Cl. ...................................... 429/32; 429/33; 429/34
[58] Field of Search .............................. 429/32, 33, 34

[56] References Cited

U.S. PATENT DOCUMENTS

| | | | |
|---|---|---|---|
| 3,558,360 | 1/1971 | Sverdrup et al. | 136/86 |
| 3,617,385 | 11/1971 | Gray | 136/86 |
| 3,754,995 | 8/1973 | Kleinschmager | 136/86 R |
| 3,834,943 | 9/1974 | Van den Berghe et al. | 136/86 D |
| 3,905,775 | 9/1975 | Sowards et al. | 23/288 FC |
| 4,142,024 | 2/1979 | Van den Berghe et al. | 429/41 |
| 4,195,119 | 3/1980 | Kummer | 429/38 |
| 4,248,941 | 2/1981 | Louis | 429/13 |
| 4,317,867 | 3/1982 | Warzawski | 429/42 |
| 4,324,844 | 4/1982 | Kothmenn | 429/34 |

Primary Examiner—Charles F. LeFevour
Attorney, Agent, or Firm—Charles F. Lind; Hugh W. Glenn; Michael F. Esposito

[57] ABSTRACT

This invention discloses a monolithic core construction having the flow passageways for the fuel and for the oxidant gases extended transverse to one another, whereby full face core manifolding can be achieved for these gases and their reaction products. The core construction provides that only anode material surround each fuel passageway and only cathode material surround each oxidant passageway, each anode and each cathode further sandwiching at spaced opposing sides electrolyte and interconnect materials to define electrolyte and interconnect walls. Webs of the cathode and anode material hold the electrolyte and interconnect walls spaced apart to define the flow passages. The composite anode and cathode wall structures are further alternately stacked on one another (with the separating electrolyte or interconnect material typically being a single common layer) whereby the fuel passageway and the oxidant passageways are disposed transverse to one another.

11 Claims, 3 Drawing Figures

SOLID OXIDE FUEL CELL HAVING MONOLITHIC CROSS FLOW CORE AND MANIFOLDING

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

A fuel cell is basically a galvanic energy conversion device that chemically combines hydrogen or a hydrocarbon fuel and an oxidant within catalytic confines to produce a DC electrical output. In one form of fuel cell, cathode material defines the passageways for the oxidant and anode material defines the passageways for the fuel, and an electrolyte separates the cathode and anode materials. The fuel and oxidant, typically as gases, are then continuously passed through the cell passageways separated from one another, and unused fuel and oxidant discharged from the fuel cell generally also remove the reaction products and heat generated in the cell. Being infeeds, the fuel and oxidant are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a high order hydrocarbon is used as the fuel and oxygen or air is used as the oxidant, and the operating temperatures of the fuel cell is between 700° and 1,100° C.

The hydrogen reaction on the anode (the negative electrode) with oxide ions generates water with the release of electrons; and the oxygen reaction on the cathode with the electrons effectively forms the oxide ions. Electrons flow from the anode through the appropriate external load to the cathode, and the circuit is closed internally by the transport of oxide ions through the electrolyte. The electrolyte insulates the cathode and anode from one another with respect to electron flow, but permits oxygen ions to flow from the cathode to the anode. Thus, the reactions are, at the:

cathode $\frac{1}{2}O_2 + 2e^- \rightarrow O^{-2}$      (1)

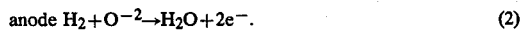
anode $H_2 + O^{-2} \rightarrow H_2O + 2e^-$.      (2)

The overall cell reaction is

$H_2 + \frac{1}{2}O_2 \rightarrow H_2O$.      (3)

In addition to hydrogen, the fuel can be derived from a hydrocarbon such as methane ($CH_4$) reformed by exposure to steam at 350° C. or above, which initially produces carbon monoxide (CO) and three molecules of hydrogen. As hydrogen is consumed, the shift reaction occurs as follows:

$CO + H_2O \rightarrow CO_2 + H_2$.      (4)

The overall reaction of hydrocarbons in the cell is illustrated by

$CH_4 + 2O_2 \rightarrow CO_2 + 2H_2O$.      (5)

Inasmuch as the conversion is electrochemical, the thermal limitations of the Carnot cycle are circumvented; therefore efficiencies in the range exceeding 50% fuel energy conversion to electrical output can be theoretically obtained. This is much higher than equivalent thermal engines utilizing the same fuel conversion, including even a conventional diesel powered engine.

The electrolyte isolates the fuel and oxidant gases from one another while providing a medium allowing the ionic transfer and voltage buildup between the electrodes. The electrodes (cathode and anode) provide paths for the internal blow of electrical current within the fuel cell to the cell terminals, which also connect then with an external load. The operating voltage across each cell is of the order of 0.7 volts maximum, so the individual cells are placed in electrical series to obtain a convenient load voltage. A series connection is accomplished between adjacent cells with an interconnect material which isolates the fuel and oxidant gases from one another while yet electronically connects the anode of one cell to the cathode of an adjoining cell. As the active electrochemical generation of electricity takes place only across the electrolyte portions of the fuel cell, any interconnect separation between the cathode and anode in order to provide the series electrical connection between the cells renders that part of the fuel cell electrically nonproductive. The percentage of interconnect to electrolyte wall area defining each cell, if high, could significantly reduce the energy or power densities of such a fuel cell.

Diffusion of the reacting species (fuel or oxidant) through the electrodes to the electrolyte also limits the cell performance. Fuel and oxidant must diffuse away from the flow in the respective passageways through the electrolyte to the reaction sites. The fuel and oxidant diffuse through the electrodes to the electrolyte and react at (or near) the three-phase boundary of the gases, the electrodes (anode or cathode), and electrolyte, where electrochemical conversion occurs. As the hydrogen partial pressure of the fuel gases decreases along the length of the fuel passageways, less voltage is generated near or at the downstream end of the fuel passageways.

While it is possible to thermally and electrically extract great quantities of energy from the fuel, it is also inherently inefficient to extract such energies to the complete depletion of the fuel and oxidant. Complete conversion of the fuel in the fuel cell is thus not sought as it is intrinsically inefficient in the overall output of the cell voltage. For both a single cell and cells in gas flow series, the maximum theoretical voltage decreases along the cell. Practical fuel cells therefore consume only 80 to 90% of the fuel because the cell voltage decreases rapidly as the hydrogen becomes less than 5% of the fuel gas. The reduction in maximum cell voltage as the fuel is consumed is an important limitation.

One proposed series of solid oxide fuel cells utilizes a ceramic support tube, and the electrodes (anode and cathode) and electrolyte are built up as layers on the support tube. The support tube is confined in a sealed housing, and the fuel and oxidant are manifolded to the housing and the reaction products are ported from the housing as required. Depending on the layer build-up, the fuel is either conveyed internally of the support tube and the oxidant is conveyed externally of the support tube (or vice versa). A practical fuel cell unit would be composed of many such tubes supported within an exterior housing, and manifolding would separate and direct the fuel and oxidant proximate the tubes.

A typical support tube might be formed of calcium stabilized zirconia ($ZrO_2+CaO$); the cathode typically would be applied to the exterior face of the support tube and might be in the form of lanthanum manganite ($LaMnO_3$); the electrolyte would be layered over a portion of the cathode, comprised, for example, of yttria-stabilized zirconia ($ZrO_2+Y_2O_3$); and the anode would be layered over the electrolyte comprised, for example, of a cobalt yttria-stabilized zirconia cermet or mixture ($Co+ZrO_2+Y_2O_3$). The oxidant would thereby flow internally of the structural tube while fuel will be circulated externally of the tube. For part of the cell where a series connection was to be made with an adjacent cell, the interconnection would be layered over the cathode at this location instead of the electrolyte and anode, to engage the anode of the adjacent cell. The interconnect might be comprised for example, of lanthanum chromite ($LaCrO_3$).

To form this type of fuel cell, the support tube must be formed with a high degree of porosity. Even with 40% porosity, the layered anode and cathode represent large diffusion barriers. The diffusion losses increase very steeply at high current densities and represent a limit on current and hence power. The minimum size of the support tube has been about 1 cm in diameter, with a side wall about 1 mm thick. A limiting factor of this support tube core arrangement is the length of path that the current must pass along the cathode and anode materials thereby inducing significant electrical resistant losses. In one effort to minimize this, the respective tubes have been shortened lengthwise and stacked end-to-end on one another, and the anodes and cathodes of the successive respective tubes have been interconnected in a serial fashion with an interconnect. This renders a single tube through which the fuel and/or oxidant passes, while the serial connection produces a higher voltage cumulative of the total number of serially interconnected individual tubes. The current flow is in line with the direction of the fuel and/or oxidant flow, namely axially of the tube configuration.

An alternate construction provides an electrical interconnect at a cordal arc section of the tube connected to the interior anode, for example, whereby adjacent tubes are stacked tangentially adjacent one another to establish a cathode-anode serial arrangement. As the current must pass circumferentially along the cathode and anode materials, significant electrical resistance losses are incurred.

Moreover, the tube supports are nonproductive and heavy so that the power and energy densities suffer when compared to other forms of energy conversion, including even the liquid electrolyte fuel cells more commonly operated at lower temperatures.

In many prior designs of solid oxide fuel cells, a feed tube for the oxidant must fit within the oxidant passageway which thus provides that this passageway must be sufficiently large to receive this tube. The power density of the fuel cells is related to the cell size, so that reduction in cell size provides for higher power density. Certain prior designs also proposed complicated porting or manifolding of the cells, having overlays of the materials that require great care in the manufacture due to the possible warping in the green state of the material layers which in turn also generally requires oversizing of the unit to provide for some margin of error should warpage occur and because of the inability to inspect and correct for this shortcoming.

SUMMARY OF THE INVENTION

This invention provides a solid oxide fuel cell having an improved monolithic core and manifolding for fuel and oxidant gases flowing to the core and for the gaseous reaction products discharging from the core.

This invention relates to a solid oxide fuel cell having a core defining a plurality of elongated passageways for carrying fuel and oxidant gases. The fuel flow passageways are each defined by anode material, and the oxidant flow passageways are each defined by cathode material. The cathode and anode materials are separated from one another in certain regions of the core by an electrolyte material to define an electrolyte wall across which electrical potential is generated; and the cathode and anode materials are separated from one another in other regions of the core by an interconnect material to define an interconnect wall across which the electrical potentials generated at the electrolyte walls are added together in series. In the preferred arrangement, the anode passageways are oriented transverse to the cathode passageways.

This invention also relates to the manifolding of the fuel and oxidant gases to the array of anode and cathode passageways, respectively. The core body approximates a rectangular parallelepiped with six faces. Two opposite side faces contain the open ends for the oxidant passageways, while the other two opposite side faces rotated approximately 90° from the first faces contain the open ends for the fuel passageways. Housing structure separately encloses these faces to the core body for defining separate manifolds for fresh oxidant flowing into one end of the oxidant passageways and for the unused portion of the oxidant discharging from the other end of these passageways, and for fresh fuel flowing into one end of the fuel passageways and for the reaction products discharging from the other end of these passageways. The remaining two faces of the core (the top and bottom) are exposed to electrical contacts to carry current between the fuel cell core and an exterior circuit or load.

In this invention, high power density can be achieved because the cell manifolding eliminates the need for the oxidant feed tubes, so that a cell passageway cross section can be determined by balancing the resistance against flow of the oxidant or fuel gases against the volume of such gases required. Not only are small cell passageways and thus high power densities achievable with the cross flow design of the core disclosed herein, but manifolding of the flow passageways is quite simple in construction and reliable in operation.

Each cathode and anode layer at the interconnect or electrolyte wall generally is much thicker than either the interconnect or the electrolyte layer (0.2 to 5 mm versus 0.02–0.1 mm). Each material (anode, cathode, electrolyte and interconnect) can be shaped separately in a green state; and while yet green, can then be stacked on one another in the proper sequence to define the core configuration; and the stacked layers can then be fired to form a rigid, self-supporting and dimensionally stable core body.

RELATED COFILED APPLICATIONS AND INVENTIONS

The application Ser. No. 541,213 entitled "Solid Oxide Fuel Cell Having Monolithic Core" cofiled herewith having John P. Ackerman and John E. Young as joint inventors, discloses a monolithically formed core consisting only of materials active in the electrochemical reactions. This means that the electrolyte and interconnect walls of the core would be formed respectively, only of anode and cathode materials layered on the opposite sides of electrolyte material, or on the opposite sides of interconnect material. This allows the use of very thin material layers and very thin resulting composite core walls. The thin composite core walls can be shaped to refine small passageways, while yet having sufficient structural integrity to withstand the fluid pressures generated by gas flow through the passageways and the mechanical stresses due to the weight of the stacked core walls on one another. This beneficially increases the power density of the fuel cell because of its reduced size and weight.

The application Ser. No. 541,184 entitled "Method of Fabricating a Monolithic Core For a Solid Oxide Fuel Cell" cofiled herewith having Stanley A. Zwick and John P. Ackerman as joint inventors, discloses the repetitive and sequential application of deposits of each of the anode, cathode, electrolyte and interconnect materials onto itself for building up the interconnect and electrolyte core walls endwise of the walls or in line with the flow passageways defined by the walls. Each separate deposit of each separate material is made over the entire core cross section simultaneously, whereby complicated shapes or cross sections of the flow passageways for the fuel and oxidant can be made as simply as can regular or symmetrical overall cross sections be made.

The application Ser. No. 541,178 entitled "Integral Manifolding Structure For Fuel Cell Core Having Parallel Gas Flow" cofiled herewith having Joseph E. Herceg as sole inventor, discloses means for directing the fuel and oxidant gases to parallel flow passageways in the core. A core wall projects beyond the open ends of the defined core passageways and is disposed approximately midway between and parallel to the adjacent overlying and underlying interconnect walls to define manifold chambers therebetween on opposite sides of the wall. Each electrolyte wall defining the flow passageways is shaped to blend into and be connected to this wall in order to redirect the corresponding fuel and oxidant passageways to the respective manifold chambers either above or below this intermediate wall. Inlet and outlet connections are made to these separate manifold chambers respectively, for carrying the fuel and oxidant gases to the core, and for carrying their reaction products away from the core.

The application Ser. No. 541,176 entitled "Solid Oxide Fuel Cell Having Compound Cross Flow Gas Patterns" cofiled herewith having Anthony V. Fraioli as sole inventor, discloses a core construction having both parallel and cross flow paths for the fuel and the oxidant gases. Each interconnect wall of the cell is formed as a sheet of inert support material having therein spaced small plugs of interconnect material, the cathode and anode materials being formed as layers on opposite sides of each sheet and being electrically contacted together by the plugs of the interconnect material. Each interconnect wall in a wavy shape is connected along spaced generally parallel line-like contact areas between corresponding spaced pairs of generally parallel electrolyte walls, operable to define one tier of generally parallel flow passageways for the fuel and oxidant gases. Alternate tiers are arranged to have the passageways disposed normal to one another. This provides for the solid mechanical connection of the interconnect walls of adjacent tiers to the opposite sides of the common electrolyte wall therebetween only at spaced point-like contact areas, where the previously mentioned line-like contact areas cross one another. The inert support material comprises between 2 and 98 wt. % of the whole core, varied as needed to minimize differential thermal expansion of the composite core wall structures.

DETAILED DESCRIPTION OF THE PREFERRED EMBODIMENT

Figure 1:
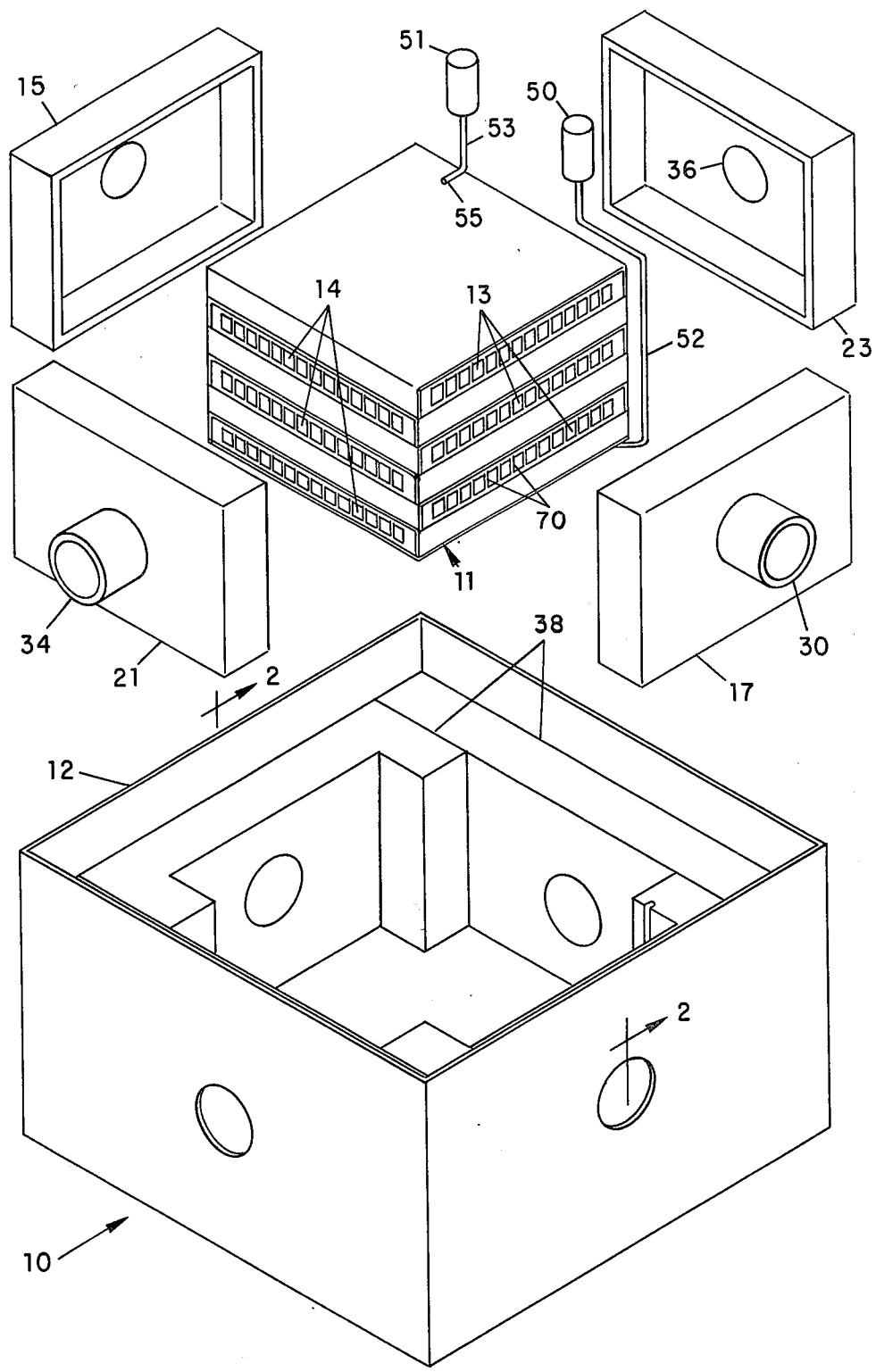
FIG. 1 is an exploded perspective view of a fuel cell formed according to this invention.
Figure 2:
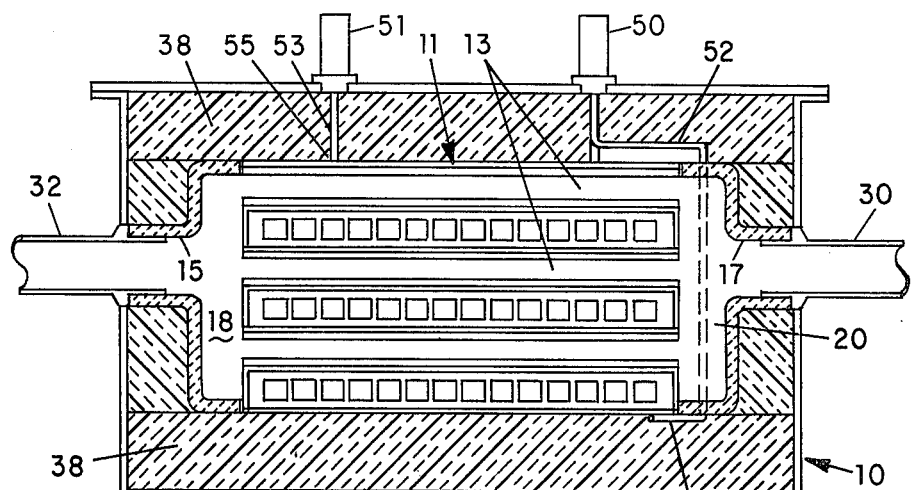
FIG. 2 is an elevational sectional view, as seen generally from line 2—2 in FIG. 1, of the fuel cell in an assembled condition.

FIGS. 1 and 2 illustrate a fuel cell 10 having a core 11 located within a housing 12. The core 11 is a one piece assembly of approximately a rectangular parallelepiped shape having two sets of opposite side faces rotated approximately 90° from another and opposite top and bottom faces at approximately 90° from the side faces. Passageways 13 and 14 extend through the core 11 between the opposite side faces. Structures 15 and 17 adjacent opposite side faces of the core 11 define spaced manifolds 18 and 20 that communicate with one another via passageways 13 formed in the core 11. Further, structures 21 and 23 adjacent the other side faces of the core define spaced manifolds (not shown) that communicate with one another via passageways 14 formed in the core 11. An inlet line 30 in structure 17 is adapted to carry gaseous fuel to the manifold 20 for flow through the passageways 13, and an outlet line 32 in structure 15 is adapted to carry all unconsumed or remaining fuel and reaction products from the manifold 18. Likewise inlet line 34 in structure 21 is adapted to carry oxidant to the core manifold for flow through the passageways 14, and line 36 in structure 23 is adapted to carry any remaining oxidant away from the core. The passageways 13 and 14 are disposed transverse to one another, so that the respective inlet and outlet manifolds for the fuel (20 and 18) and for the oxidant (unnumbered) are located alternately adjacent one another. The core 11 and manifold structures 15, 17, 21 and 23 components when thus assembled are snugged or otherwise connected together and fit within the housing 12, and insulation 38 surrounding these components separates them from the housing. Also, the annular space between the core 11 and the separate manifold structures can be packed or filled as at 39 with a ceramic paste or the like seal to minimize leakage of the gases between the fuel and outlet manifolds.

Figure 3:
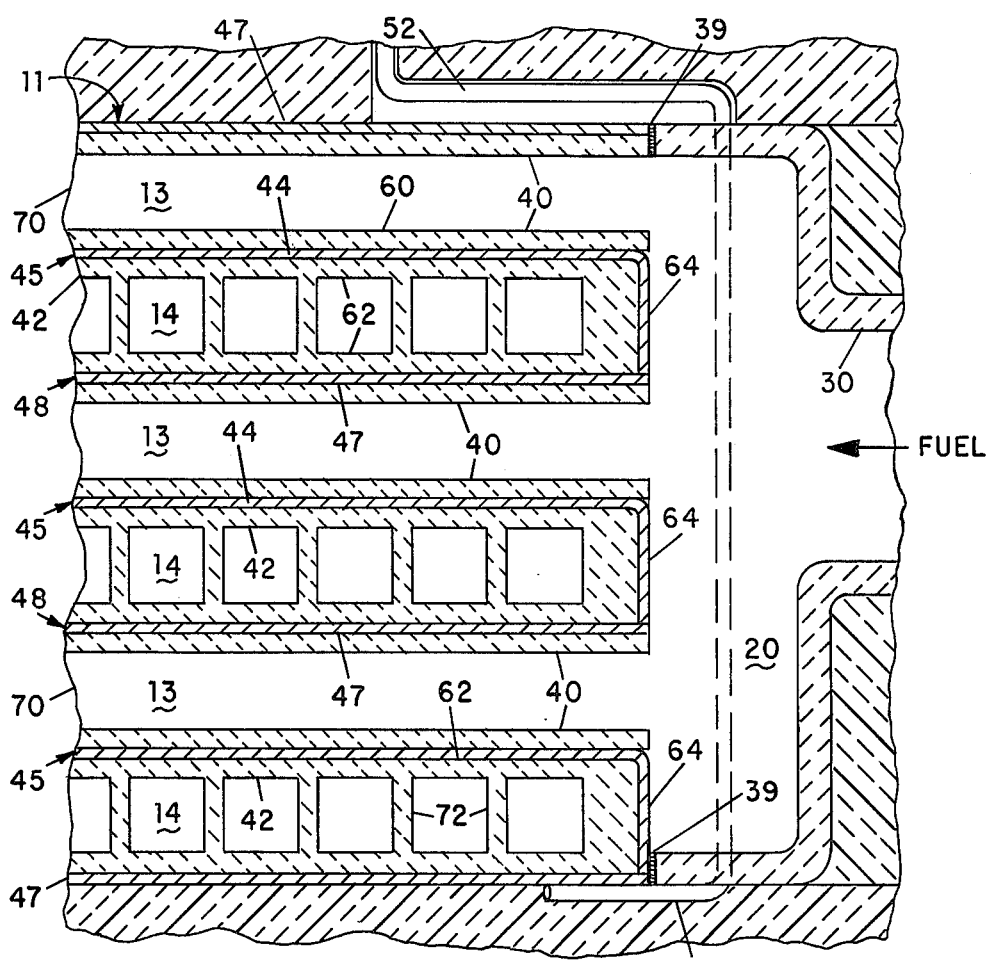
FIG. 3 is an enlarged view of part of FIG. 2, showing more details of construction of the fuel cell.

FIG. 3 illustrates in enlarged cross section the core 11 for the fuel cell 10 of FIG. 1. Specifically, passageways 13 for the fuel are illustrated to extend in the plane of the viewing paper and are formed with only anode electrode material 40 defining the exposed walls of the passageways 13; while the passageways 14 for the oxidant are illustrated to extend normal to the viewing paper and are formed with only the cathode electrode material 42 defining the exposed walls of the passageways 14.

Each anode 40 and each cathode 42 further is sandwiched at spaced opposing sides between electrolyte material 44 and interconnect material 47. These composite anode and cathode wall structures are further alternately stacked on one another (with the separating electrolyte 44 or interconnect 47 typically being a single common layer) whereby the fuel and oxidant passageways are disposed transverse to one another.

Thus, on one side, the anode 40 is separated from the cathode 42 by a thin layer of electrolyte material 44 to form an electrolyte wall 45. This also defines a "cell" and voltage buildup will occur across this electrolyte wall 45 between these electrodes 40 and 42 in the presence of fuel and oxidant. This buildup occurs as the fuel in the anode passageways 20 and the oxidant in the cathode passageways 26 electrochemically combine across the electrolyte 44. The voltage is small for each anode and cathode electrode cell combination (or electrolyte wall 45), generally less than 1.0 volt, and even this voltage drops off when external draw is taken from the electrodes.

On the other side, the anode 40 and cathode 42 are separated by a generally thin layer of interconnect material 47 to form an interconnect wall 48. The interconnect wall 48 serves to isolate the fuel and oxidant gases from one another, and also to electrically connect together the anode electrode of the one cell and the cathode electrode of the adjacent cell. This creates thereby a series circuit with the adjacent cells, and thereby progressively accumulates the small separate voltages of the separate cells.

In an actual fuel cell of the type shown herein, many serially connected anode-cathode cell combinations 45 will be provided, exceeding perhaps even several hundred. The outermost interconnects (or adjacent electrode) of the core 11 are connected electrically via conductors to external terminals 50 and 51 of the fuel cell to provide the cumulative electrical output at the terminals. In FIGS. 1, 2 and 3 this is illustrated schematically by conductors 52 and 53 connected between terminals 50 and 51, respectively; and the lowermost interconnect or cathode 42 and the uppermost interconnect or anode 40 as by contacts 54 and 55. In this manner, the overall fuel cell voltage at the exterior terminals 50 and 51 might be of the order of between twenty and four hundred volts, depending upon the design.

In a preferred embodiment of the disclosed fuel cell core 11, the core walls are formed by only the active anode, cathode, electrolyte and interconnect materials, and no nonactive material is otherwise used therein for support. Each active material layer when adjacent one another and defining the fuel and oxidant passageways 13 and 14 are quite short or of small spans to provide that the passageways themselves are of small cross section (perhaps only several square millimeters). The passageways 13 and 14 are illustrated as being rectangular in shape, but this can be varied to circular, hexagonal, triangular or many other shapes desired. Thus the anode material 40 has a thin layer 60 between the fuel passageways 13 and the respective layer of the electrolyte 44 and interconnect 47; while the cathode 42 has a thin layer 62 between the oxidant passageways 14 and the respective layer of the electrolyte 44 and interconnect 47. The webs or walls 70 of the anode 40 or the webs or walls 72 of the cathode 42, each crossing between the anode layers 60 or cathode layers 62, are comprised solely of the respective anode or cathode material and in effect lie in the direct flow of the respective oxidant or fuel. These walls 70 or 72 serve to carry the generated electrical current across the span between the electrode layers 60 and 62 forming the electrolyte walls 45 and the interconnect walls 48. These walls 70 and 72 also structurally connect the thin electrode layers 60 and 62 of the adjacent electrolyte walls 45 and interconnect walls 48 to support the core against the pressures and mechanical loads to which the core will be subjected.

All active core materials (the anode, cathode, electrolyte and interconnect) are integrally bonded or fused together to make the core 11 of a monolithic construction. However, the core 11 is actually formed of the separate materials in a sequential manner, which might take the form of several known approaches. Thus, the separate arrays of anode and cathode passageways could be extruded in pliant or green form, while the thinner layers of the electrolyte 44 and the interconnect 47 could be tape cast. The materials could then be stacked onto one another again while the materials were yet in a green or pliant stage at the appropriate location and orientations so that the adjacent anode and cathode passageway arrays would sandwich either the electrolyte or interconnect layer. Ultimately, the stacked core configuration would be sintered or otherwise fired and heat cured in an oven or the like (not shown) at temperatures approximately 1500°–1800° C. for durations exceeding 1-2 hours and even approaching 20-40 hours, whereby it would become self supporting and dimensionally stable.

It will be appreciated that in the disclosed core 11, the fuel and oxidant passageways 13 and 14 are laid out in a crosswise pattern so that the fuel and oxidant flow transverse to one another. This cross flow arrangement allows for direct and efficient manifolding of the opposite open ends of the flow passageways, and the manifolds 18 and 20, etc., can be extended over almost the entire opposite side faces of the core. The fuel and oxidant gases would flow to the core at the purities and flow rates required, and the remaining unconsumed fuel and reaction products and oxidant would typically be combusted either in the outlet manifold or special combustion (not shown) whereat all available energies of the fuel can be completely utilized and/or burned. Generally, the pressure differential between the inlet and outlet of the fuel and the oxidant such as between fuel manifolds 20 and 18 is quite low, and the velocity of the gases within or through the passageways 13 and 14 is likewise quite low.

The anode and cathode in the electrolyte walls 45 are porous to the degree required to allow the fuel and oxidant gases confined on the opposite sides thereof to electrochemically combine, while the electrolyte 44 and interconnect 47 are impervious and serve to isolate the fuel and oxidant gases physically from one another. Likewise, the electrolyte walls 45 are electronically nonconductive as between the cathode and anode formed on opposite sides of the electrolyte, but the electrolyte does provide ionic conductivity between the fuel and oxidant; and moreover both the cathode and anode are electrically conductive. On the other hand, the interconnect walls electronically connects the anode and cathode of the cells on opposite sides of the wall in series with one another while blocking the transfer of oxygen ions.

The electrolyte 44 (see FIG. 3) can be folded down at 64 (or up—not shown) to enclose the end face of the anode or cathode material which otherwise would be directly exposed to the air and fuel in the manifold. This would be done while yet in the green state and would be needed to separate the fuel and oxidant gases on opposite sides of the porous electrode materials (without the electrolyte or equivalent material) from reaching one another.

Under one preferred embodiment, a power cell formed according to this invention could have as many as 10,000–15,000 separate core passageways, each of relatively small cross section, perhaps only several square mm. The electrolyte and interconnect layers might be in the range between 0.002 and 0.01 cm in thickness and preferably between 0.002 and 0.005 cm in thickness; while the anode and cathode layers each might be in the range between 0.002 and 0.05 cm in thickness and preferably between 0.005 and 0.02 cm in thickness. The length of the web walls 70, 72 between the electrode layers might be 0.002–0.2 cm while the spacing between such web walls might be of similar distances. Each web wall might be of the order of 0.002–0.1 cm in thickness. The monolithic core construction is believed to provide sufficient structural integrity and dimensional stability even with these wall thicknesses. The power density would be enhanced because no nonactive support structure is used in the cell.

The anode, cathode, electrolyte and interconnect materials for the layers would be matched as closely as possible to one another with respect to each coefficient of thermal expansion so as to minimize separation problems due to differential thermal expansion. The fact the material layers are extremely thin will tend to reduce this problem.

A typical cathode typically would be lanthanum manganite ($LaMnO_3$); the electrolyte would be comprised of yttria-stabilized zirconia ($ZrO_2+Y_2O_3$); and the anode would be a cobalt yttria-stabilized zirconia cermet or mixture ($Co+ZrO_2+Y_2O_3$). The interconnect might be comprised for example, of lanthanum chromite ($LaCrO_3$), where the lanthanum manganite ($LaMnO_3$) and lanthanum chromite ($LaCrO_3$) are suitably doped to obtain electrical conductivity.

While the structure has been disclosed as a fuel cell, it is possible with the separate manifolding of both ends of the flow passageways to operate the device as an electrolysis cell. Thus, steam can be admitted to one end of the fuel passageways and air to the corresponding end of the oxidant passageways, and in the presence of an electrical potential inputted to the device via the exterior terminals, electrolysis can take place to define hydrogen gas and steam at the outlet end of the fuel passageways and oxygen-enriched air at the outlet end of the oxidant passageways.

The embodiments of the invention in which an exclusive property or privilege is claimed are defined as follows:

1. A fuel cell for electrochemically combining fuel and oxidant for generation of galvanic output, comprising the combination of a core having an array of electrolyte and interconnect walls, each electrolyte wall consisting of thin layers of cathode and anode materials respectively, sandwiching a thin layer of electrolyte material therebetween, each interconnect wall consisting of thin layers of the cathode and anode materials, respectively sandwiching a thin layer of interconnect material therebetween, said electrolyte walls and said interconnect walls being spaced apart and alternately arranged with the like cathode and anode layers on each being disposed adjacent to one another, spaced webs of such cathode and anode materials extended transverse to and between the layers of the corresponding material of each adjacent pair of electrolyte and interconnect walls operable to define a plurality of core passageways therebetween where the inside faces of the passageways are formed either of only the anode material or of only the cathode material, each core passageway having the anode material on the inside faces thereof being for the fuel and each core passageway having the cathode material on the inside faces thereof being for the oxidant, means to direct the fuel and the oxidant for flow through the respective anode and cathode passageway, and means to direct the galvanic output from the anode and cathode materials to an exterior circuit.

2. An electrochemical fuel cell according to claim 1, wherein each electrolyte wall and each interconnect wall is generally planar, and wherein the said walls are disposed substantially parallel to one another.

3. An electrochemical fuel cell according to claim 1, wherein the passageways for the fuel are each substantially parallel to one another, and wherein the passageways for the oxidant are each substantially parallel to one another, and wherein the passageways for the fuel and for the oxidant are disposed transverse to one another.

4. An electrochemical fuel cell according to claim 1, wherein cells are defined between the adjacent fuel and oxidant passageways disposed on opposite sides of any electrolyte wall operable to generate electrical potential in parallel connections with one another, and wherein the anode and cathode materials defining the adjacent fuel and oxidant passageways disposed on opposite sides of any interconnect wall are in series connections with one another operable to accumulate the generated electrical potentials of the cells.

5. An electrochemical fuel cell according to claim 1, wherein each layer of the electrolyte and interconnect materials is of the order of 0.002–0.01 cm thick.

6. An electrochemical fuel cell according to claim 1, wherein each layer of the cathode and anode materials is of the order of 0.002–0.05 cm thick.

7. An electrochemical fuel cell according to claim 1, wherein the webs of the anode and cathode materials are of the order of 0.002–0.1 cm in thickness.

8. An electrochemical fuel cell according to claim 1, wherein the webs of the anode and cathode materials are extended between the electrolyte and interconnect walls distances of the order of 0.002–0.2 cm.

9. An electrochemical fuel cell according to claim 8, wherein the spacing between the web walls is of the order of 0.002–0.2 cm.

10. An electrochemical fuel cell according to claim 1, wherein the means for directing fuel and oxidant for flow through the respective passageways includes separate manifolding structures each extended over the full face of the core where the open ends of the passageways are located, and wherein the separate manifolding structures for the fuel and for the oxidant are located opposite one another relative to the core.

11. An electrochemical fuel cell according to claim 1, wherein said cathode is lanthanum manganite ($LaMnO_3$); said anode is cobalt yttria-stabilized zirconia cermet or mixture ($Co+ZrO_2+Y_2O_3$); said electrolyte is yttria-stabilized zirconia ($ZrO_2+Y_2O_3$); and said interconnect is lanthanum chromite ($LaCrO_3$), the lanthanum manganite and lanthanum chromite being suitably doped to obtain electrical conductivity.

* * * * *